F. C. THOMPSON.
ORCHARD SPRAYING MACHINE.
APPLICATION FILED MAR. 28, 1911.
1,073,646.
Patented Sept. 23, 1913.
2 SHEETS—SHEET 1.
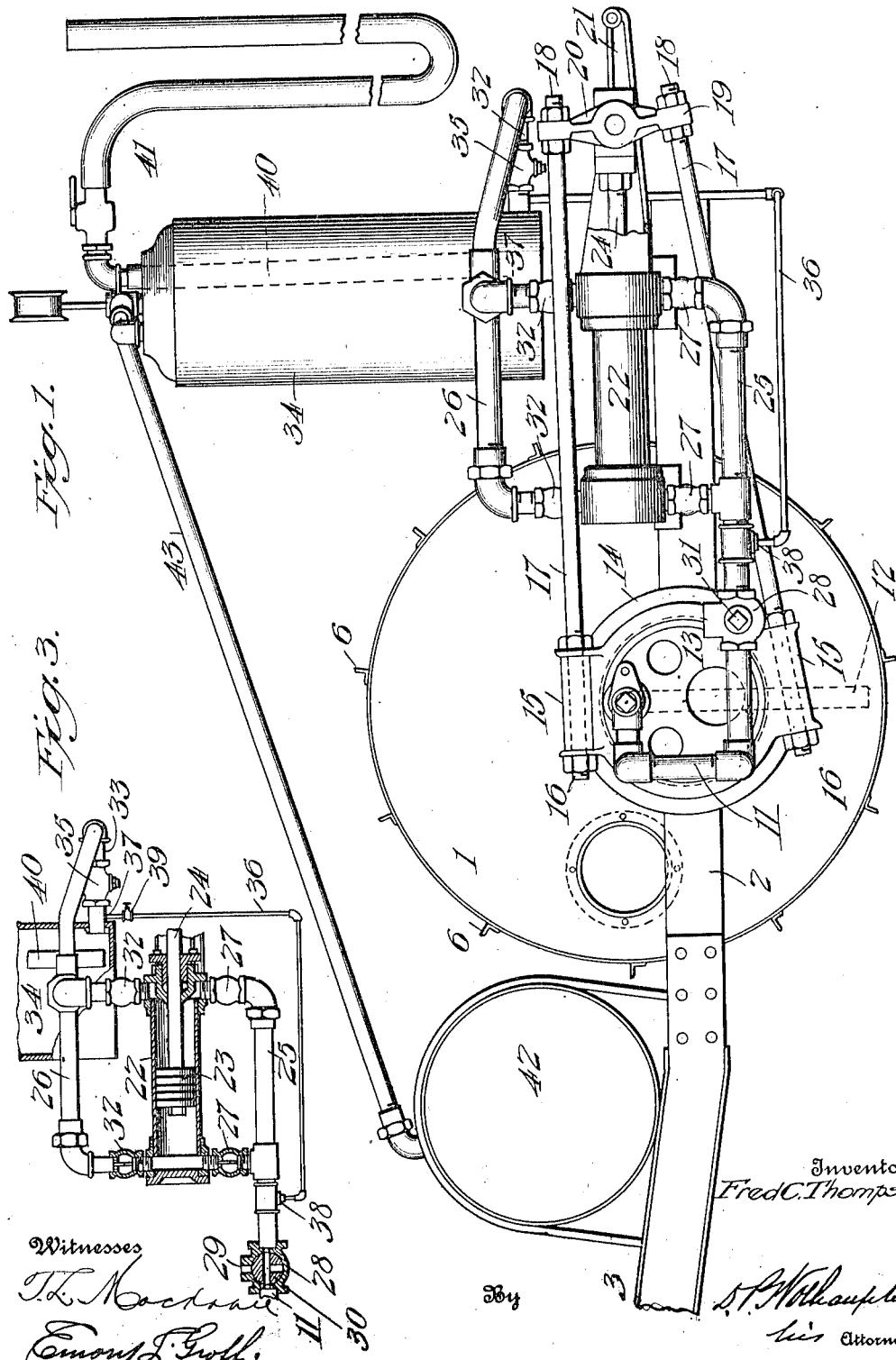
Witnesses
Inventor
Fred C. Thompson,
By
his Attorney

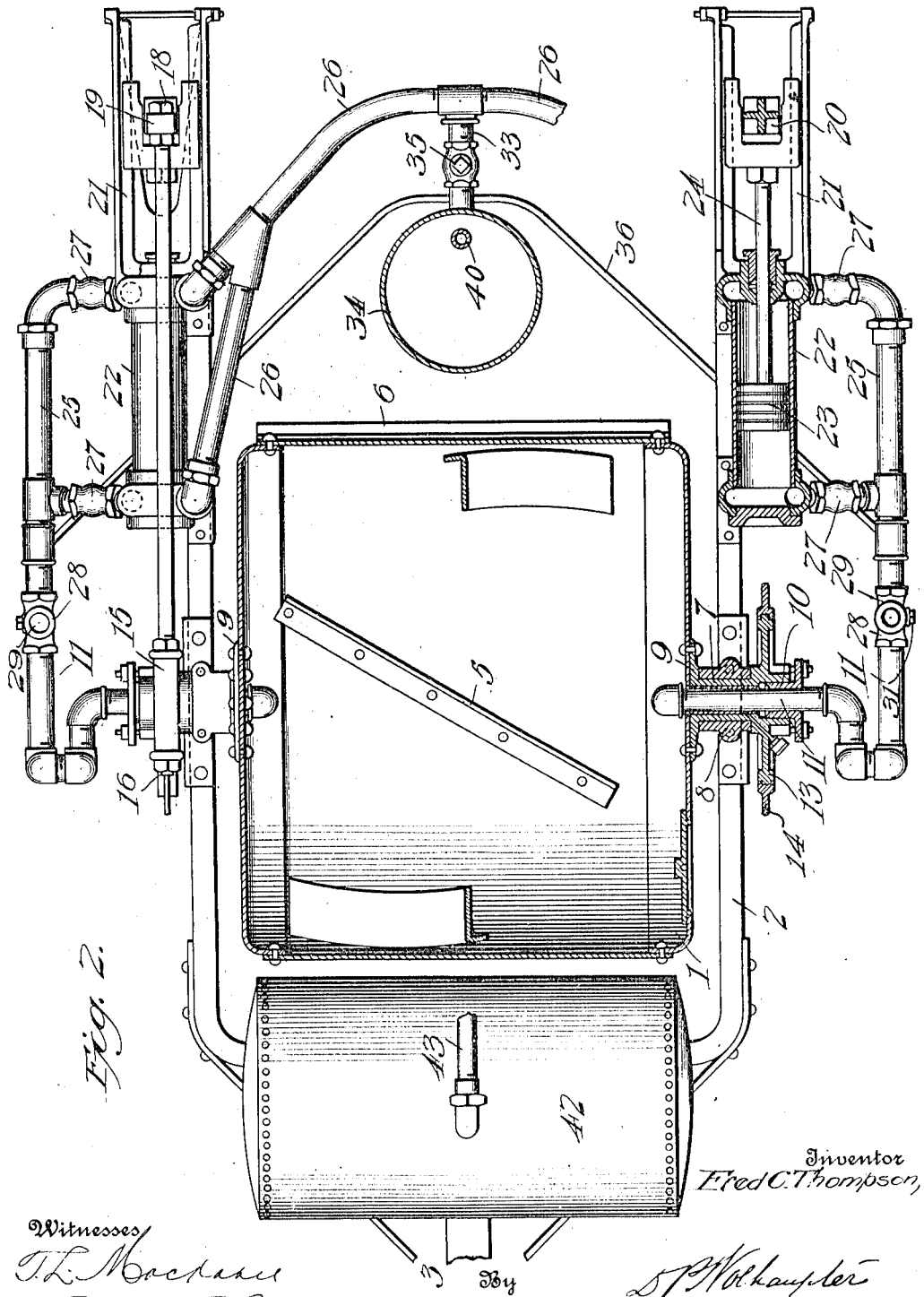

UNITED STATES PATENT OFFICE.

FRED C. THOMPSON, OF GRANGER, WASHINGTON.

ORCHARD-SPRAYING MACHINE.

1,073,646.   Specification of Letters Patent.   Patented Sept. 23, 1913.

Application filed March 28, 1911. Serial No. 617,449.

*To all whom it may concern:*

Be it known that I, FRED C. THOMPSON, a citizen of the United States, residing at Granger, in the county of Yakima and State of Washington, have invented certain new and useful Improvements in Orchard-Spraying Machines, of which the following is a specification.

This invention relates to the subject of orchard spraying machines of the type that are employed for spraying the trees and plants of an orchard to preserve and protect the same against the ravages of insects and kindred troubles that are controlled by the orchardist through the use of corrective chemicals applied in a spray directly to the tree and plant.

To this end the invention contemplates a thoroughly practical construction of orchard spraying machine embodying in its organization means for carrying a large quantity of spray-liquid and for keeping such liquid thoroughly stirred and agitated through the movement of the machine over the ground, while at the same time including novel and efficient pumping mechanism in combination with an arrangement of tanks that greatly improves the efficiency of the machine. In this connection, the invention comprises means for carrying not only in storage a constantly stirred quantity of the spray-liquid, but also a comparatively small working supply of spray-liquid in an advantageous location and under suitable pressure for immediate expulsion, and also an auxiliary air pressure supply so arranged and isolated with respect to the other parts of the machine as to provide for the maintenance of a most effective air pressure supply that contributes greatly to the power of the machine and permits the parts thereof to be constructed in reasonable sizes and thoroughly balanced.

It is, therefore, one of the principal objects of the present invention to provide a novel arrangement of tanks respectively for the storage of the main supply of spray-liquid, for the storage of a separate working supply of such liquid under air pressure, and for the separate and independent storage of an auxiliary air pressure in order that the operations of pumping and spraying the liquid may be carried on with uniformity and certainty, while at the same time, the arrangement of the tanks is such that the machine is exceedingly well balanced on its axle which is a necessary condition in any successful spraying machine.

With these and many other objects in view, which will more readily appear as the nature of the invention is better understood, the same consists in the novel construction, combination and arrangement of parts hereinafter more fully described, illustrated and claimed.

The essential features of the invention are necessarily susceptible to structural modification without departing from the principle or scope thereof, but a preferred and practical embodiment thereof is shown in the accompanying drawings, in which:—

Figure 1 is a side elevation of an orchard spraying machine embodying the improvements contemplated herein. Fig. 2 is a sectional plan view of the machine. Fig. 3 is a detail sectional view of the pumping mechanism, showing more plainly the valve and piping arrangement.

Like references designate corresponding parts in the several figures of the drawings.

The improved orchard spraying machine claimed herein is of the rolling type adapted to be transported over the field by a team and carried and supported as an entirety upon a rolling tank that rolls over the ground. This rolling tank is designated in the drawings by the numeral 1 and is journaled within a carrying frame 2 which may be conveniently of a rectangular form and equipped at one end with suitable draft connections 3.

The rolling tank 1 may be of any practical construction, but is preferably made of sheet metal plates in boiler fashion and is of a sufficient size to provide a substantial rolling support for the entire apparatus, while at the same time constituting the main liquid supply reservoir which contains therein the spray liquid. For filling and cleaning purposes, the said tank 1 may be provided in one of its walls, or on its periphery, with a suitably closed filling hole and upon the interior periphery of the tank body there are secured a plurality of diagonally arranged baffle blades 5 which act as stirring and agitating devices to keep the liquid contents of the rolling tank thoroughly mixed and stirred as the machine is carried over the field. Also, the said rolling tank is preferably provided upon its external periphery with the regular series of traction calks 6 that serve to hold the machine against slipping.

The rolling tank 1 includes as a part of the mounting thereof, at each end, within and upon its carrying frame 2, a hollow axle member 7 journaled in a bearing box 8 upon the side bar of the carrying frame, and provided at its inner end with an attaching head or flange 9 that is riveted or otherwise rigidly secured to the end head of the tank. At its extreme outer end, beyond the bearing box 8, each hollow axle member 7 is so constructed as to be equipped with a stuffing box 10 of conventional design so as to provide a liquid tight seal for a liquid-suction terminal 11, which extends through the said hollow axle member into the interior of the rolling reservoir tank 1, and is provided with an inlet leg 12, within the tank, that dips into the liquid in the latter, as indicated by the dotted lines in Fig. 1 of the drawings.

In addition to the structural features referred to, each of the hollow axle members 7 is provided with an eccentric disk 13 upon which is fitted an eccentric strap 14 provided at diametrically opposite points with bolt sleeves 15 in which are received and bolted the front end portions 16 of the upper and lower connecting rods 17, the front ends 18 of which rods are bolted respectively in the opposite terminal collars 19 of a crosshead 20, said crosshead being slidably mounted in a stationary crosshead guide 21, supported beyond one end of a pump cylinder 22 within which operates a reciprocating piston 23 whose rod 24 connects with the crosshead referred to.

The pump elements 22, 23 and 24 constitute parts of a pumping mechanism that is preferably, though not necessarily, duplicated at both sides of the machine, but inasmuch as both sets of pumping mechanism and the operation thereof are identical, a description of one will suffice for the other.

Referring particularly to each pumping mechanism as a pumping unit, it may be noted that while the same may be of any practical type and construction that will provide means for pumping liquid and air into the tank which holds the working supply of spray liquid under air pressure, I preferably employ the pumping mechanism disclosed in my Patent No. 1,028,401, dated June 4, 1912. This construction of pumping unit or pumping mechanism is shown for illustration in the drawings of this application, and referring briefly thereto, the same includes, in addition to the cylinder 22, the piston 23 and the piston rod 24, a feed pipe 25 and a discharge pipe 26 respectively employed for feeding and exhausting the pump cylinder of the liquid or air which is being pumped thereby. The feed pipe 25 is branched so as to communicate with both ends of the pump cylinder, this branching simply consisting of valved pump inlet connections 27, and said feed pipe 25 also has connected therewith an air suction terminal 28 which is shown in Fig. 3 as being in direct communication with the open air and also with the liquid suction terminal 11 previously referred to. This air suction terminal 28 is shown as simply consisting of a valve casing or union having a port 29 in communication with the outer air and having mounted therein a three-way valve 30 provided with an externally arranged operating head 31. This valve, when turned in one direction, closes the air inlet port of the terminal 28 and opens up communication between the liquid supply terminal 11 and the feed pipe 25 proper. Likewise, when said valve is turned to another position, the liquid suction terminal 11 is cut off and communication is open between the feed pipe proper and the open air. A third position of the valve will close the communication of both of said terminals 28 and 11 with the feed pipe proper 25.

The pump discharge pipe 26 is provided with valved pump outlet connections 32 respectively connected to, and in communication with, the opposite ends of the pump cylinder. Also, the pump discharge pipe 26 is intended to have its delivery end fitted to, and in communication with, the container or reservoir for both the liquid and air through the medium of a suitable connection such as a single delivery coupling or nipple 33 in communication with both of the discharge pipes 26 and suitably fitted to the working-supply tank 34 which constitutes the container or reservoir for a comparatively small, yet sufficient, working supply of the spray liquid under the pressure of air. The delivery coupling or nipple 33 is preferably provided with a main cut-off valve 35 which is opened or closed according as the pump is in operation or out of operation.

Each pumping unit also includes a lubricating by-pass pipe 36, one end of which, as at 37, is connected with the delivery coupling or nipple 33, or with the container or reservoir 34, beyond the valve connections thereof, and the other end of which, as at 38, is connected with the feed pipe 25 beyond the valve connections thereof, but also between the latter and the suction terminals 28 and 11. This by-pass pipe 36 is provided with a controlling valve 39 which is intended to be open sufficiently to allow a modicum of the liquid in the tank 34 to flow to the feed pipe 25 and be drawn into and through the pump proper while the latter is pumping air, thus lubricating the valve and improving the pumping action, as set forth in the other application aforesaid.

Each pumping unit therefore provides for separately pumping the spray liquid, and air under pressure, into the working-supply tank 34, and the latter is equipped with a discharge pipe 40 dipping into the same and having suitably connected therewith from the exterior of the tank, any suitable spray nozzle equipment 41.

Another important feature of this invention resides in the employment of an auxiliary compression tank 42 which may be conveniently mounted in a horizontal or other convenient position upon the front part of the carrying frame 2 and having an air pipe connection 43 between the same and that part of the working-supply tank 34 above the level of the liquid therein. Means are thus provided for holding in storage and under compression an auxiliary or supplemental supply of air that augments that in the tank 34 and not only insures uniformity and certainty in the spraying operation, but greatly increases the capacity and power of the machine. Furthermore, this arrangement of tank permits the use of a comparatively small working-supply tank 34, besides providing means for dividing the weight of the machine to secure a better balanced effect.

I claim:

1. An orchard spraying machine, comprising, in combination, a carrying frame, a rolling tank journaled in the frame at an intermediate point and constituting the main liquid reservoir, a separate working supply tank for the storage of a working supply of liquid under air pressure, said working supply tank being supported upon the frame at one side of the rolling tank, an auxiliary compression tank for air alone arranged on the frame at the other side of the rolling tank, and having a pipe connection with the working supply tank, and pumping mechanism for pumping both liquid and air into the working supply tank.

2. An orchard spraying machine comprising a carrying frame, a rolling tank journaled in the frame and constituting the main liquid reservoir, said rolling tank having stirring means, a separate working supply tank for holding liquid under air pressure and having a sprayer equipment, an auxiliary compression tank for air having a pipe connection with the working supply tank, and a pumping mechanism operated from the rolling tank and having a delivery connection with the working supply tank, the said pumping mechanism being also provided with separate valve controlled inlets respectively in communication with the rolling tank and with the outer air.

In testimony whereof I hereunto affix my signature in the presence of two witnesses.

FRED C. THOMPSON.

Witnesses:
L. M. ZAUTKE,
G. D. GOFF.